Dec. 14, 1965  H. W. LAMB  3,222,748
TILE PRESS MECHANISM

Original Filed Oct. 12, 1962  6 Sheets-Sheet 3

Harold W. Lamb
INVENTOR.

BY J. N. Wells
ATTORNEY

Dec. 14, 1965   H. W. LAMB   3,222,748
TILE PRESS MECHANISM
Original Filed Oct. 12, 1962   6 Sheets-Sheet 4

Harold W. Lamb
INVENTOR.

BY
ATTORNEY

Dec. 14, 1965 H. W. LAMB 3,222,748
TILE PRESS MECHANISM
Original Filed Oct. 12, 1962 6 Sheets-Sheet 5
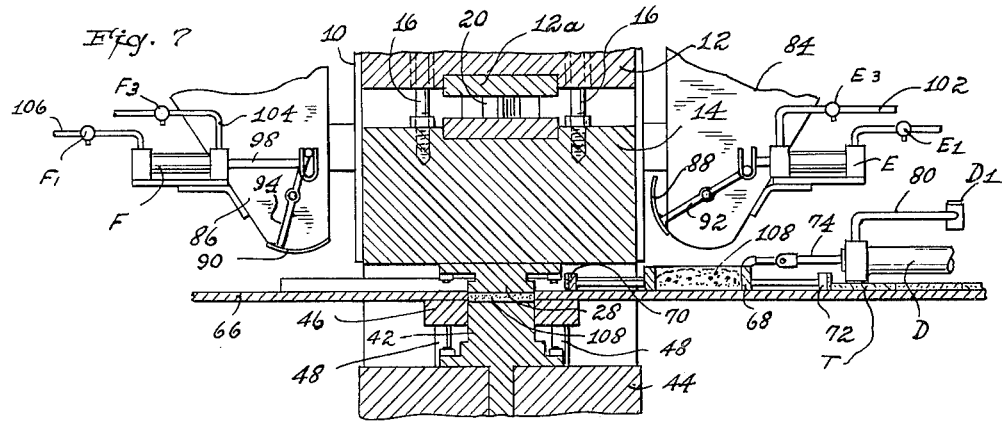
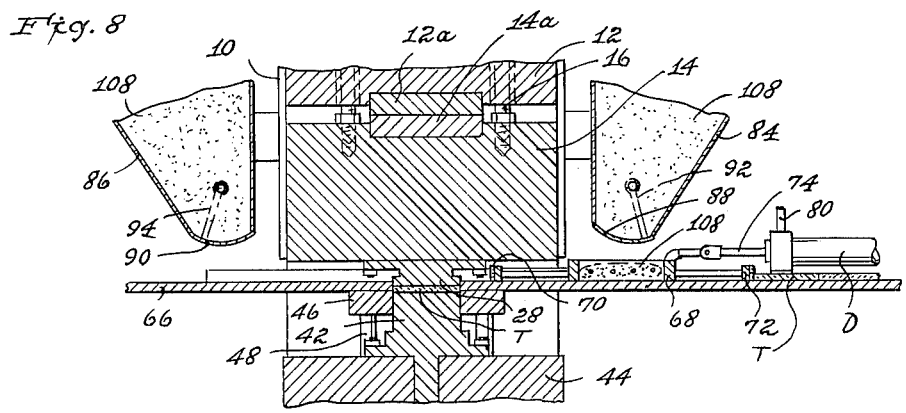
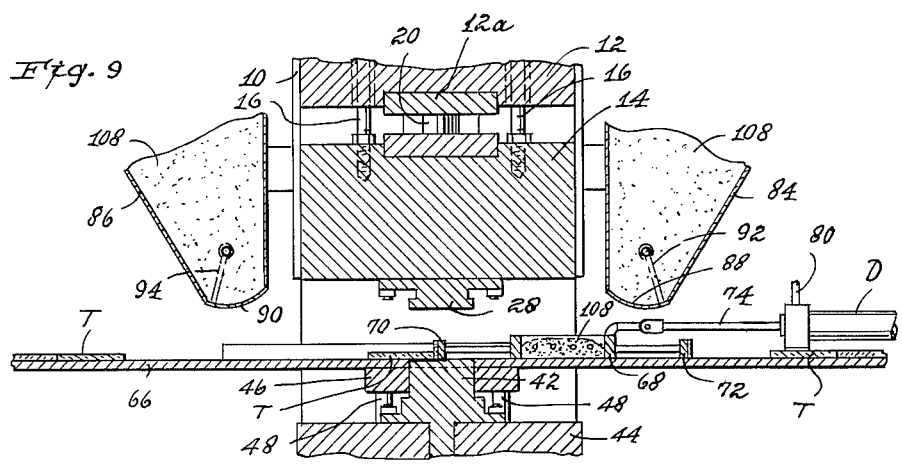
Harold W. Lamb
INVENTOR.
BY J. W. Wells
ATTORNEY Dec. 14, 1965 H. W. LAMB 3,222,748
TILE PRESS MECHANISM
Original Filed Oct. 12, 1962 6 Sheets-Sheet 6

Harold W. Lamb
INVENTOR.

BY *(signature)*
ATTORNEY

United States Patent Office 3,222,748
Patented Dec. 14, 1965

3,222,748
TILE PRESS MECHANISM
Harold W. Lamb, Washington Crossing, N.J., assignor to Crossley Machine Company, Inc., a corporation of New Jersey
Original application Oct. 12, 1962, Ser. No. 230,044, now Patent No. 3,179,998, dated Apr. 27, 1965. Divided and this application Jan. 22, 1965, Ser. No. 427,373
4 Claims. (Cl. 25—42)

This is a division of application, Serial No. 230,044, filed October 12, 1962, now Patent No. 3,179,998.

This invention relates to power presses of the general type employed in compressing pulverized clay, or other pulverized material, into tile or other compact products, adaptable to such press and die operations.

In presses of the type referred to, the die cavity is formed by means of a die case, surrounding and slidable on a vertical, stationary die member in a telescopic manner, and the tile is ejected from the cavity by lowering the die case. The clay dust for a new tile is supplied to the die cavity by means of a rectangular dust box or tray, which first pushes the previously completed tile from the cavity area, after which the die case is immediately raised, and the cavity formed thereby is filled with clay dust, by the sweeping or wiping action of the dust box, as it passes over the cavity. The dust box is then returned to its starting position, and the ram member of the press, shaped for close fitting insertion into the die cavity, is lowered into the cavity to compact the clay dust therein into a tile.

In previous presses of the type mentioned, the impact of the ram member on the clay dust in the die cavity is effected by mechanical power, and has been found to have the serious disadvantage of trapping air in the clay dust, due to the rapidity and force of the impact, and thereby resulting in defective tile.

Therefore, one of the principal objects of the present invention is to provide a tile press having means for effecting an initial retarded impact on the clay dust for forcing the air from the dust, followed immediately by a more rapid and heavier impact for forming the completed tile. For the purposes of this invention, I employ two heavy impact members, one above the other, the lowermost of which is suspended from the other in vertically spaced and movable relation, and from which the ram depends; and the uppermost of which is attached to the piston rod of an air cylinder having electirical control valve means for simultaneously admitting air pressure into both ends of the cylinder for effecting a retarded lowering of both impact members until the ram slightly presses the dust in the die cavity, and then releasing the air pressure from the lower end of the cylinder while maintaining the air pressure in the upper end, thereby effecting an accelerated and heavy impact of the uppermost impact member upon the lowermost member, the force of which impact is transmitted to the ram and the clay dust of the die cavity. The initial force exerted by the ram as it comes into the clay dust and compresses it, is adjustable and controllable by the weight and cooperation of the lowermost or suspended member, and by the speed with which it is lowered which, in turn, is determined by the speed and length of travel between this member in its upper starting position, and its position upon contact of the uppermost member therewith.

The speed of the simultaneous downward movement of the impact members, is controlled by a differential of air pressure above and below the piston to which the uppermost impact member is attached and/or also, the transverse area or diameter of the piston rod, which traverses the bottom portion of the cylinder, and the diameter of the piston, and creates a preponderance of pressure above the piston, which may be further varied by means of regulators in the air pressure lines.

The vertical space between the lowermost and uppermost impact members may also be varied as required by the axial adjustment of the rods upon which they are slidably mounted. The greater the spacing, the more acceleration of movement of the uppermost member and, consequently, the greater the force of impact of the uppermost upon the lowermost member.

In previous presses of the type mentioned, the dust box is supplied with clay dust at only one side of the press, so that after the initial stroke, or horizontal movement of the dust box across the die cavity, to deposit therein the clay dust for the next tile, the dust box is returned to its starting position, for another supply of dust. In order to insure a complete filling of the die cavity, the dust box is necessarily supplied with a greater quantity of clay dust than that required to fill the die cavity. Consequently, in its return passage over the die cavity, the back end of the box drags, and impacts more dust into that already in the die cavity, especially toward the front edge of the cavity, resulting in a tile of uneven thickness and compactness.

Therefore, another, and important, object of this invention is to provide a tile press of the character referred to, having means for supplying clay dust to the dust box on each side of the press, so that the die cavity is filled with clay dust by a single stroke of the dust box across the cavity, resulting in an even, uniform filling of the cavity.

It is to the mechanism referred to in the last two preceding paragraphs that the claims in this divisional application are directed.

Other objects and advantages of my improved tile press mechanism referred to, will be apparent, or pointed out in the following specification in which reference is had to the accompanying drawing, forming a part thereof, and in which:

FIG. 7 is a detail section similar to FIG. 2, and showing the initial impact of the press ram;

FIG. 8 is a similar detail view showing the completion of a tile;

FIG. 9 is a similar view showing a completed tile being pushed by the clay dust box from the area of the die cavity.

Figure 3:
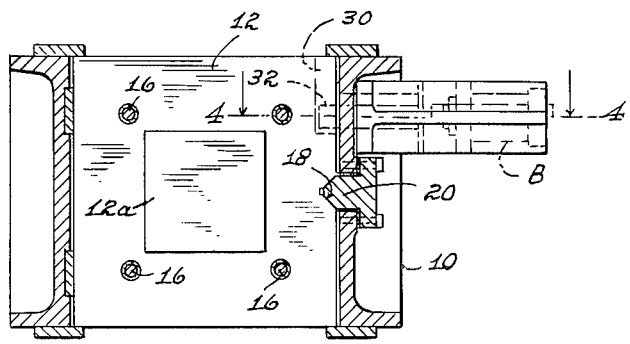
FIG. 3 is a section taken on the line 3—3 of FIG. 1.
Figure 5:
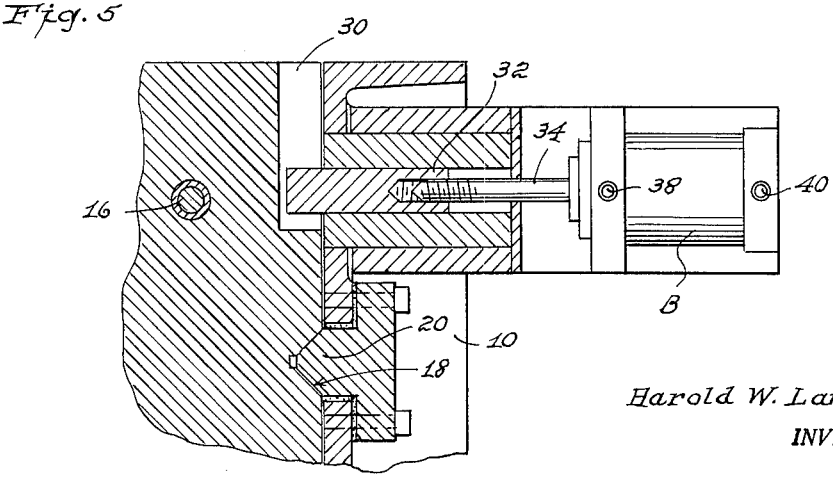
FIG. 5 is a section taken on line 5—5 of FIG. 4, with the air cylinder also shown exteriorly.
Figure 6:
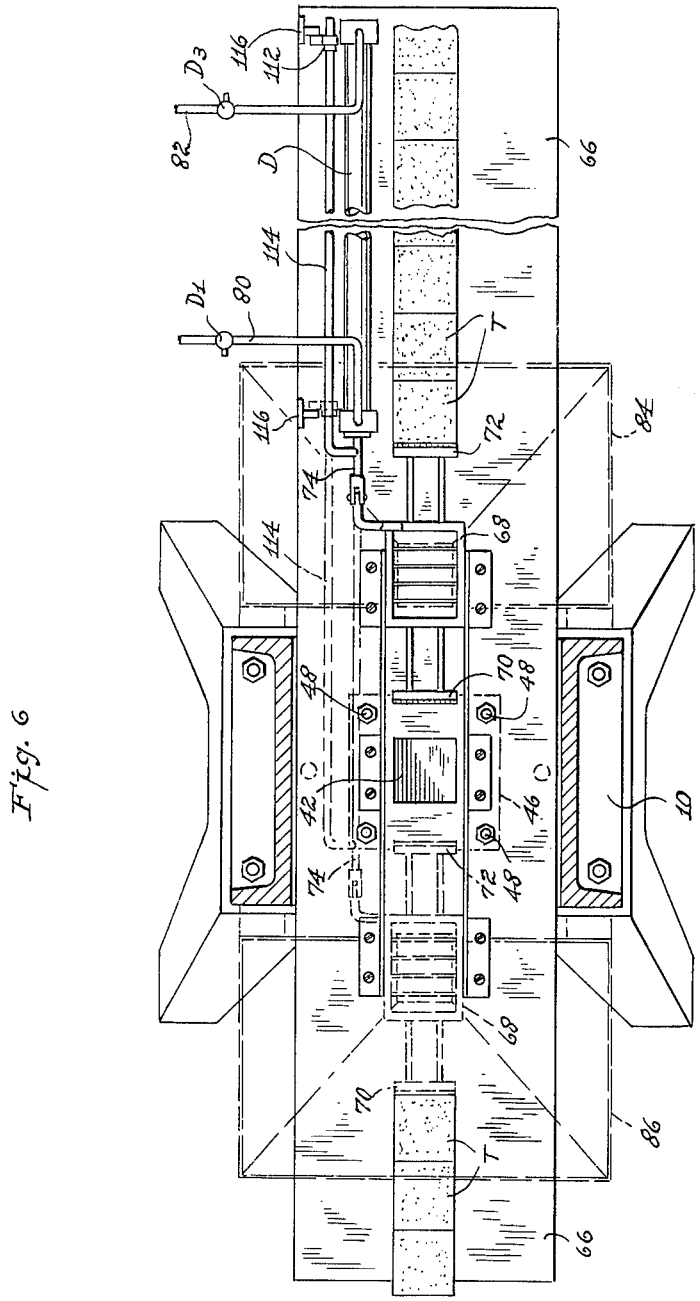
FIG. 6 is a section taken on the line 6—6 of FIG. 2.

Referring to the drawing in which like reference characters designate like parts in the several views, 10 is a vertical press base upon which is mounted a pair of heavy metal impact members 12 and 14, one above the other. The lowermost impact member 14 is suspended from the uppermost member 12 in vertically spaced and unrestrained slidable relation on a plurality of rods 16 which are threaded into the member 14 to provide means for adjusting the space between the two members, each of which is notched on one edge, as indicated at 18 (FIGS. 3 and 5) for engagement with a V-shaped guide member 20 mounted on the press base 10.

Figure 4:
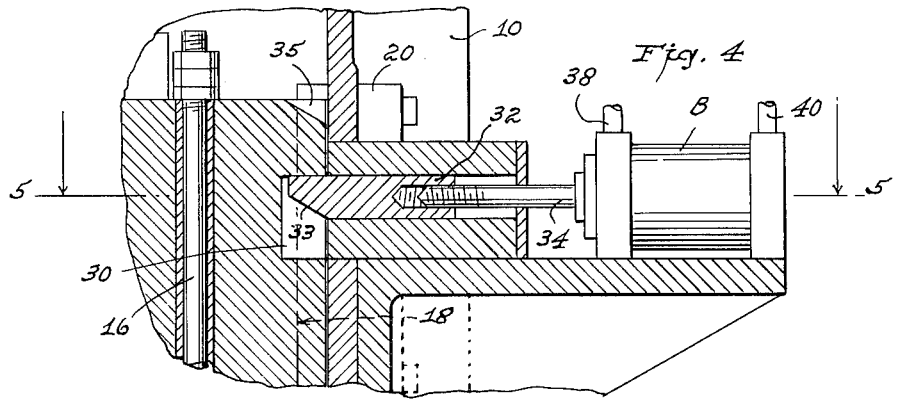
FIG. 4 is a section taken on the line 4—4 of FIG. 3, with the air cylinder shown exteriorly.

The uppermost impact member 12 is rigidly attached to the piston rod 22 of an air cylinder A, the ends of which are closed and in communication with a source of air pressure through pipes 24 and 26 having air pressure regulators 25 and 27 and electrical control valves A1 and A4. The press ram 28 is rigidly attached to the lowermost impact member 14 in depending relation therewith. One edge of the uppermost member 12 is provided with a socket 30 for engagement therein of horizontal latch bar 32 which is attached to the piston rod 34 of an air cylinder B mounted on the press base 10 and the ends of which are in communication with a source of air pressure through pipes 38 and 40 provided with electrical control valves B–1 and B–3. This latch bar is slidably inserted into the socket to hold the members 12 and 14 in their uppermost starting positions and is withdrawn to permit downward movement of those members. The members 12 and 14 may be made of cast iron and provided with steel contact plates 12–a and 14–a. The bottom of the inner end of the bar is inclined as shown at 33 (FIG. 4) and upon the upward movement of member 12 is retracted by contact with a beveled portion 35 in the upper edge of the member 12.

A stationary and vertically elongated die member 42 is mounted on a horizontal portion 44 of the press base, and a die case 46 is slidably or telescopically mounted over the die member 42 for forming a die cavity below the ram 28. The die case 46 is attached through rods 48 and yoke 50 to the piston rod 52 of an air cylinder C, the ends of which are in communication with a source of air pressure through pipes 54 and 56 having electrical control valves C–1 and C–4. The upward movement of the piston rod 56 and die case 46 is limited by an adjustable wedge device 58 operated by a handle 60. The downward movement of the piston rod 52 is limited by vertical rods 62 adjustably mounted at their lower ends in a plate 62 on the bottom of the cylinder C and in abutting engagement at their upper ends with the yoke 50.

The horizontal plate or platform 66 is rigidly attached to the top of the die case 46 with its top surface flush with that of the die case and extends a substantial distance forwardly and rearwardly of he die case. A rectangular clay dust box or tray 68 having an open bottom is mounted on the platform for slidable movement thereon across a die cavity formed by the stationary member 42 and the die case 46 in either direction. The dust box has projecting portions or bumpers 70 and 72 at its ends for pushing completed tile from the die cavity in advance of the arrival of the dust box over the die cavity. One end of the dust box 68 is attached by means of an offset connection to the piston rod 74 of an air cylinder D which is in parallel but offset relation with the path of travel of the dust box. As shown, the air cylinder is laterally offset but, obviously, it could be offset from the dust box by elevating the air cylinder above the platform 16 at a sufficient height to clear the dust box during its back and forth travel across the die cavity. The air cylinder D has communication at its ends with a source of air pressure through pipes 80 and 82 which are provided with electrical pressure control valves D–1 and D–3.

As illustrated, the dust box 68 is supplied with clay dust at each end of its stroke from hoppers 84 and 86 in which their bottom outlet ends are closed by pivotally mounted gates 88 and 90 provided with operating levers 92 and 94 which are connected, respectively, to the piston rods 96 and 98 of air cylinders E and F which are in communication with a source of air pressure through pipes 100, 102, 104 and 106 having electrical pressure control valves E–1, E–3, F–1 and F–3.

Figure 1:
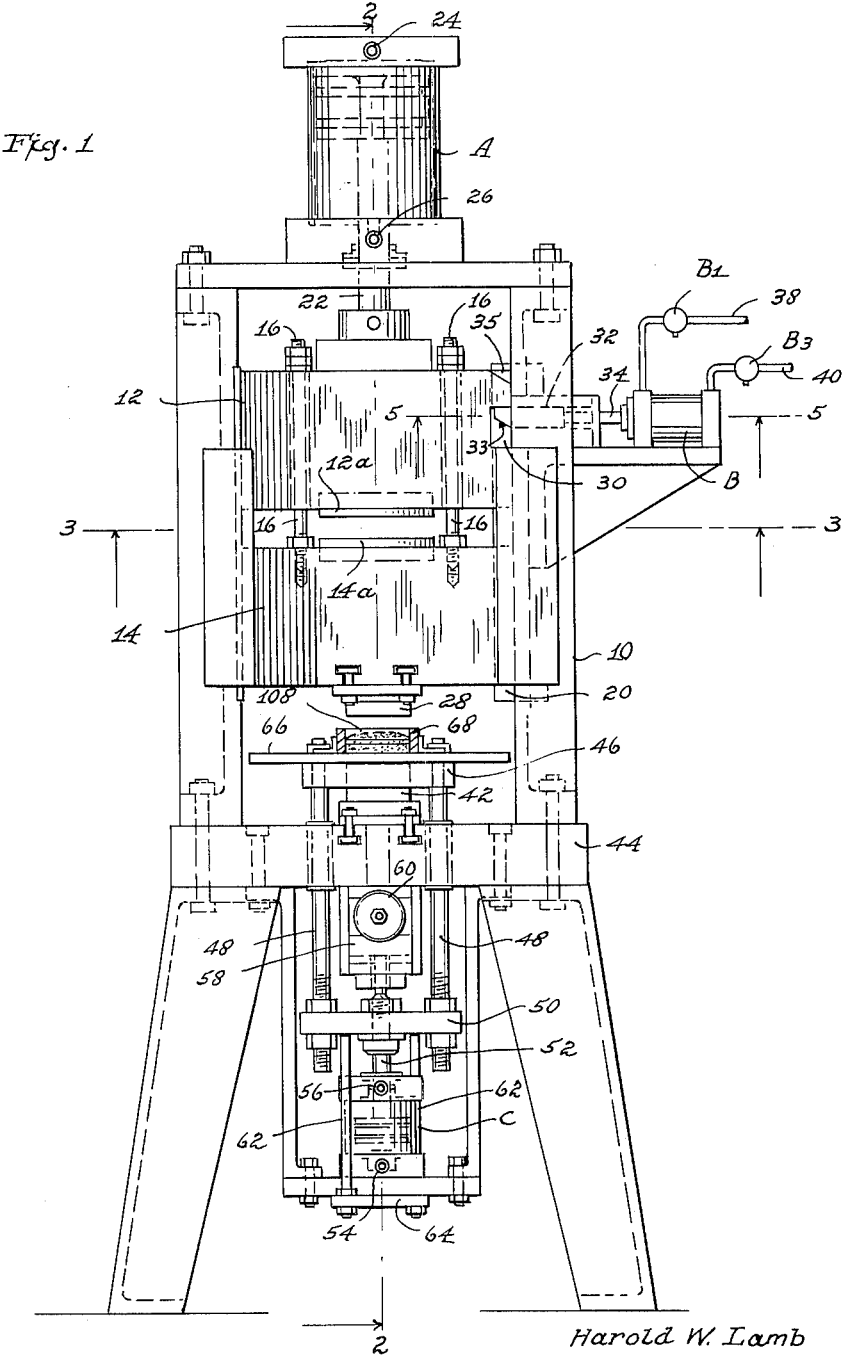
FIG. 1 is a front elevation of a tile press, in accordance with the present invention, with some of the parts omitted in the illustration.
Figure 2:
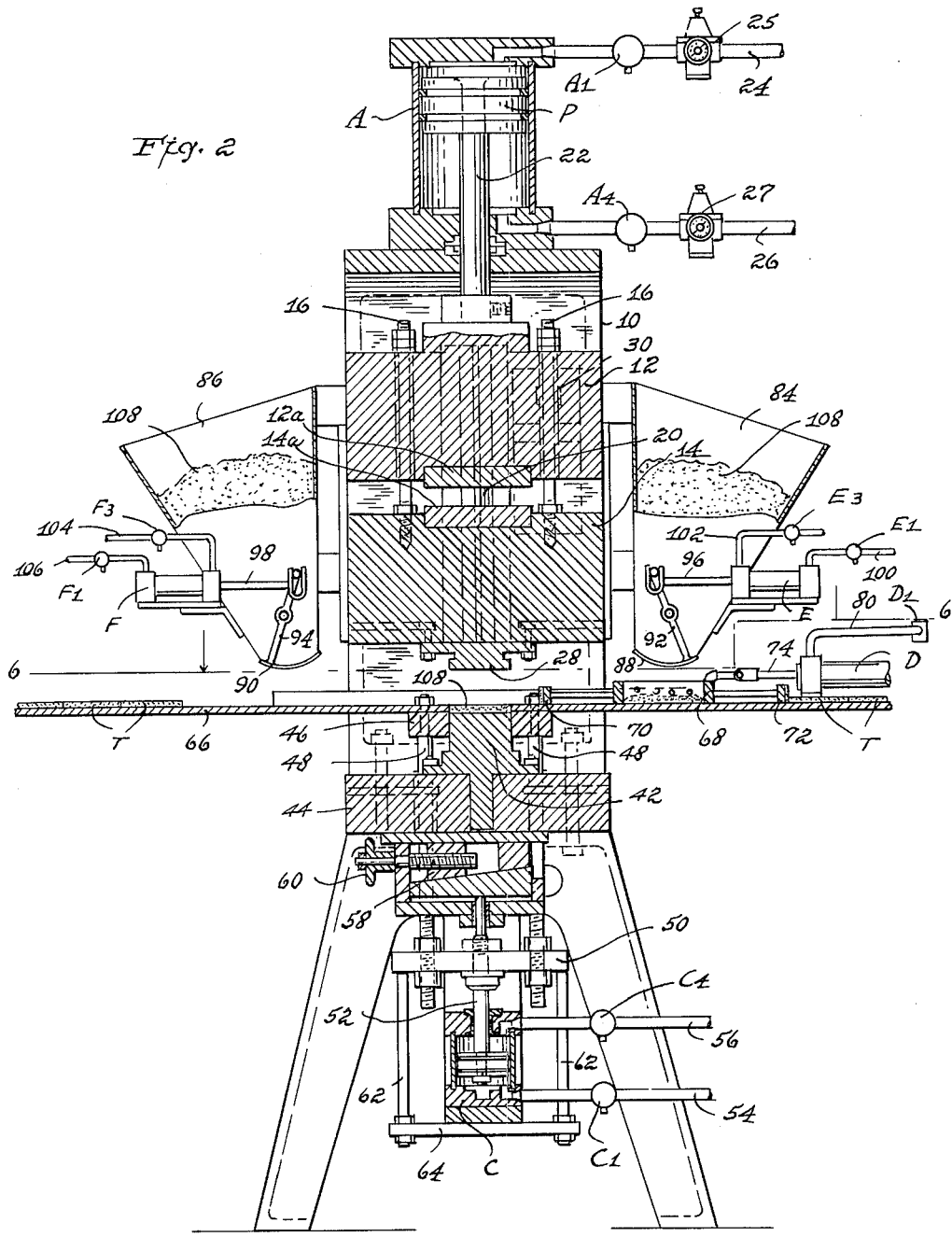
FIG. 2 is a section taken on the line 2—2 of FIG. 1.
Figure 10:
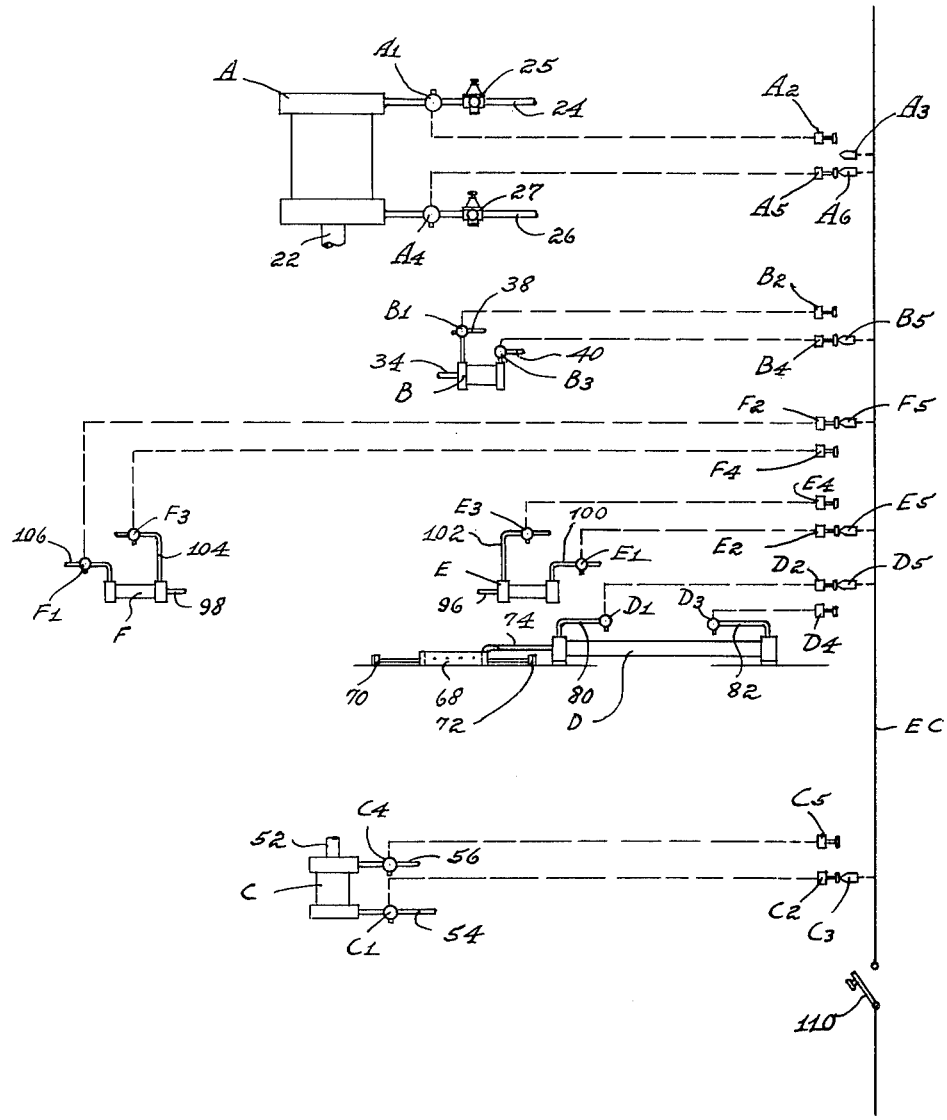
FIG. 10 is a schematic diagram showing the arrangement of the several air cylinders, electrical pressure control valves and switches employed in the press illustrated.

The diagram FIG. 10 schematically indicates the arrangement of the various air cylinders, electrical pressure control valves and switches at the end of one stroke of the dust box 68, after pushing a completed tile T from the area of the die cavity and filling the die cavity with clay dust 108, as shown in FIG. 2. The connections of the switches with the electrical valves are indicated in broken linking lines. As shown in the diagram, air pressure is on the bottom of cylinder A through switch A–5 and contact A–6, having returned the piston P, together with the impact members 12 and 14 to their uppermost starting positions. Air pressure is on the back of cylinder B through switch B–4 and contact B–5, having inserted the latch bar 32 into the socket 30 in the upper impact member 12. Air pressure is on the bottom of cylinder C through switch C–2, contact C–3 and valve C–1 holding the die case 46 together with the platform 16 in its raised or cavity forming position. Air pressure is on the front of cylinder D through switch D–2, contact D–5 and valve D–1, holding dust box 68 in its starting position. Air pressure is on the back ends of cylinders E and F through switch E–2 and contact E–5 and through switch F–2 and contact F–5, holding the gates 88 and 90 in closed position.

Although the electrical valves and switches are shown schematically in separate relation, in actual practice, they are all coordinated into an automatic timing switch unit, connected in an electrical circuit EC, so that when started into operation by closing a switch 110, the air cylinders will function in cooperative sequence until the switch is again opened. Since such timing units are conventional and form no part of the present invention, illustration of details is omitted in the drawing.

FIG. 7 shows the ram 28 upon its initial retarded impact on the clay dust 108 in the die cavity. In this phase of a cycle, the latch bar 32 will have been withdrawn from the socket 30, thereby releasing impact members 12 and 14 for downward movement, and both valves A–1 and A–4 of cylinder A will be open and admitting air pressure into each end of the cylinder. As previously mentioned, due to the transverse area of the piston rod 22, which extends through a packing in the bottom end of the cylinder, this thereby causes a preponderance of pressure against the upper end of the piston P, which forces the impact members 12 and 14 downwardly at a retarded rate of speed to effect a light impact of the ram 28 in the clay dust 108 in the die cavity. During this stage, the gate 90 of hopper 84 is opened by cylinder E to deposit a quantity of clay dust 108 into the dust box 68, which is still held in its starting position by the piston in cylinder D.

FIG. 8 shows the ram 28 upon completion of the formation of a tile T. In this stage, the air pressure has been released from the bottom portion of cylinder A thereby applying the full air pressure against the top of the piston P, thereby accelerating the member 12 downwardly and bringing contact plate 12–a against contact plate 14–a with great force which is transmitted to the ram 28 to complete the pressing of clay dust 108 into a tile T. As previously mentioned, the force of impact by member 12 is determined by acceleration of member 12 and to the vertical distance between contact plates 12–a and 14–a as governed by the axially adjustable rods 16. Further variations may be effected by the weight of member 12 and the air pressure applied through pipes 24 and 26, as controlled by air pressure regulators 25 and 27. At this stage the dust box 68, now filled with clay dust, is still held in its starting position.

FIG. 9 shows the start of the dust box with its charge of clay dust 108 on its stroke across the die member 42, pushing the completed tile T therefrom. The air pressure has been released from the top of cylinder A through valve A–1 and the pressure applied to the bottom of the cylinder through valve A–4. At this time the latch bar 32 is forced into the socket 20 by cylinder B under air pressure through valve B–3. Immediately before the clay dust in the dust box 68 reaches the edge of the die member 42 the air pressure is released from the top of cylinder C, through valve C–4 and the pressure applied to the bottom of the cylinder through valve C–1 which raises the die case 46 to form the die cavity. As the dust box 68 continues its stroke the cavity will be evenly filled with clay dust through sweeping or wiping action of the following end of the dust box, which will continue its stroke until stopped under the hopper 86 to receive a supply of clay dust, which will be deposited in the die cavity upon its return stroke to its starting position, as shown in FIG. 2, to begin a new cycle of operation, as already described. The dust box 68 may be stopped at each end of its stroke by means of a collar 112 on a rod or bar 114 attached to the piston rod 72 and the spaced abutments 116 on the platform 70, or by other suitable means.

From the foregoing description it will be seen that I have provided a tile press having the following outstanding advantages over previous designs, namely (1) means for pressing tile without the employment of cams, screws or other conventional means, a press in which the preliminary operation of expelling the air from the clay dust in the die cavity and the final pressing operation are almost simultaneous and, because of the speed of movement of the impact members, this press operates much faster than presses of previous designs; (2) both the air expelling operation and the final impact operation are completely adjustable as to both force and speed; (3) the great forces required to compact tile are obtained through acceleration of weight, without the necessity of heavy motors and other expensive power equipment; (4) due to the action of this press all applied forces are utilized in compacting the tile, and not dissipated; and (5) means for eliminating the return stroke of the dust box, thereby preventing the dragging of additional clay dust into the die cavity after it has been evenly filled during the initial stroke of the dust box over the die cavity, thereby ensuring a uniform deposit of clay dust in the die cavity and a resulting uniform thickness and compactness of the tile.

Since, as previously mentioned, the claims in this Divisional application are all directed to the press mechanism by means of which the objects referred to in the above recital (5) are effected, it should be understood that the mechanism described is applicable only to a press (1) in which the die cavity is formed by means of a die case 46 of the type illustrated slidably mounted on a stationary vertically elongated die member 42; (2) in which a horizontal platform 16, having an opening coincident with the inner wall of the die case, is fixedly mounted on the top of the die case and vertically movable therewith; in which the dust box 68 is slidably mounted on this platform; (3) and in which the air cylinder D for operating the dust box is fixedly mounted on the platform in offset relation with the path of travel of the dust box, and vertically movable with the platform.

Therefore, my improved mechanism could not be applied or adapted to a press in which the die cavity is formed by means of a vertically movable elongated die member slidably mounted within an opening in a stationary horizontal platform on which the dust box is slidably mounted as, for example, disclosed in Ackermann Patent 1,652,883, nor to a press construction of the type disclosed in Van der Pyl Patent 2,674,008 or in Lapidus Patent 3,060,540, all of which were cited in the parent application in connection with the subject matter of the present Divisional application.

My improved press mechanism is simple, efficient and economical, and ensures the production of tile of uniform thickness and compactness and also doubles the rate of production as compared with a press in which the dust box is supplied with dust at only one side of the die cavity.

Obviously, various modifications or changes may be made in my improved mechanism without departing from the spirit or scope of my invention. Therefore, it should be understood that the embodiment of my invention shown and described is intended to be illustrative, only, and restricted only by the appended claims.

I claim:

1. In a tile press of the type having a vertical base, a vertically elongated stationary die member on a horizontal portion of said base, a vertically movable die case slidably mounted over said stationary member for forming a die cavity, an open bottomed dust box horizontally slidable on a platform across said die cavity for depositing clay dust therein, said dust box having abutment means for pushing completed tile from the area of the die cavity, and a vertically movable ram on said base above the die cavity for pressing the clay dust deposited therein into tile; means for depositing clay dust in said die cavity in a single sweep of said dust box from either side of said cavity, said means comprising, in combination, a horizontal platform fixedly mounted on the top of said die case and vertically movable therewith, said platform having an opening coincident with the inner wall of said die case, an air cylinder fixedly mounted on said platform in parallel, but offset, relation with the path of travel of said dust box and having means for attaching its piston to one end of said dust box, said air cylinder having communication at each end with a source of air pressure provided with electrical pressure control valve means for effecting movement of said dust box in either direction across, and a limited distance beyond the farther edge of the die cavity; means for supplying clay dust to said dust box at either end of its stroke to be swept into the die cavity upon its next reverse stroke across said cavity; and the abutment means on said dust box comprising projecting portions at both its ends for abutment with a tile from either direction to push it from the area of the die cavity.

2. A tile press as in claim 1 in which the means for supplying clay dust to the dust box comprises hoppers on opposite sides of the die cavity normally closed at their bottoms by movable gates, and electrically controlled air pressure means for actuating said gates in cooperation with said dust box and said vertically movable ram for selectively discharging clay dust from said hoppers into said dust box.

3. A tile press as in claim 1 and including a pair of stop abutments on the platform spaced in parallel relation with the air cylinder, an offset rod or bar attached to the piston rod of the air cylinder for effecting movement of the dust box, said rod or bar extending rearwardly in parallel relation with said air cylinder, and a single abutment at the rear end of said offset rod or bar coengageable with one of said stop abutments at either end of a stroke of the cylinder piston for positively stopping the dust box under the opening in the bottom of the adjacent clay dust supply hopper.

4. A tile press as in claim 1, including electrically controlled air cylinder means for actuating said die casing, said dust box and said vertically movable ram in cooperative sequence for effecting downward movement of said ram only after the dust box has cleared the area of the die cavity.

References Cited by the Examiner

UNITED STATES PATENTS

| 1,652,883 | 12/1927 | Ackermann | 25—103 |
| 3,179,998 | 4/1965 | Lamb | 25—102 |

FOREIGN PATENTS 526,946   6/1931   Germany.

J. SPENCER OVERHOLSER, *Primary Examiner.*